United States Patent
Chan et al.

(10) Patent No.: US 10,901,222 B2
(45) Date of Patent: *Jan. 26, 2021

(54) OPTICAL SYSTEM

(71) Applicant: Apple Inc., Cupertino, CA (US)

(72) Inventors: Victoria C. Chan, Sunnyvale, CA (US); John N. Border, Campbell, CA (US); Yury A. Petrov, Half Moon Bay, CA (US); Yoshihiko Yokoyama, Katta-gun (JP)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,214

(22) Filed: Nov. 13, 2019

(65) Prior Publication Data

US 2020/0081257 A1    Mar. 12, 2020

Related U.S. Application Data

(63) Continuation of application No. 15/866,195, filed on Jan. 9, 2018, now Pat. No. 10,520,734.

(60) Provisional application No. 62/523,647, filed on Jun. 22, 2017.

(51) Int. Cl.
*G02B 27/01* (2006.01)
*G02B 27/09* (2006.01)

(52) U.S. Cl.
CPC ..... *G02B 27/0172* (2013.01); *G02B 27/0955* (2013.01); *G02B 27/0176* (2013.01)

(58) Field of Classification Search
CPC ............ G02B 27/0172; G02B 27/0955; G02B 27/0176; G06F 3/01
See application file for complete search history.

(56) References Cited

U.S. PATENT DOCUMENTS

| | | | |
|---|---|---|---|
| 6,349,004 B1 | 2/2002 | Fischer et al. |
| 6,563,638 B2 | 5/2003 | King et al. |
| 7,733,572 B1 | 6/2010 | Brown et al. |
| 8,634,139 B1 | 1/2014 | Brown et al. |
| 9,244,265 B2 | 1/2016 | Asakura et al. |
| 9,244,280 B1 | 1/2016 | Tiana et al. |
| 9,715,067 B1 | 7/2017 | Brown et al. |
| 2017/0255015 A1 | 9/2017 | Geng et al. |

*Primary Examiner* — Wen Huang
(74) *Attorney, Agent, or Firm* — Treyz Law Group, P.C.; G. Victor Treyz; David K. Cole

(57) ABSTRACT

An electronic device may include a display with a concave surface. A linear polarizer may be formed on the concave surface. A quarter wave plate may receive light from the linear polarizer. A catadioptric lens may have first and second lens elements. The first lens element may have first and second opposing surfaces. The second lens element may have opposing third and fourth surfaces. The first surface may be convex and may face the display. The fourth surface may be concave. The second surface may be concave. The third surface may be convex and may match the second surface. An additional quarter wave plate may be formed as a coating on the third surface. A partially reflective coating may be formed on the first surface. A reflective polarizer may be formed as a coating on the fourth surface. An additional polarizer may be formed on the reflective polarizer.

20 Claims, 4 Drawing Sheets

OPTICAL SYSTEM

This patent application is a continuation of U.S. patent application Ser. No. 15/866,195, filed Jan. 9, 2018, which claims the benefit of provisional patent application No. 62/523,647, filed Jun. 22, 2017, which are hereby incorporated by reference herein in their entireties.

BACKGROUND

This relates generally to optical systems and, more particularly, to optical systems for devices with displays.

Lenses may sometimes be used to allow a viewer to view a nearby display. For example, electronic devices such as virtual reality glasses use lenses to display images for a user.

If care is not taken, lenses and other optical components in these electronic devices may be bulky and heavy and may not exhibit satisfactory optical performance.

SUMMARY

An electronic device such as a head-mounted device or other electronic device may include a display system and an optical system. The display system and optical system may be supported by support structures that are configured to be worn on the head of a user. The electronic device may use the display system and optical system to present images to the user while the device is being worn by the user.

The display system may have a pixel array that produces image light associated with the images. The pixel array may have a concave surface. The display system may also have a linear polarizer through which image light from the pixel array passes and a quarter wave plate through which the light passes after passing through the linear polarizer. The linear polarizer and quarter wave plate may be located between the pixel array and the optical system to produce circularly polarized light. For example, the linear polarizer may be formed on the concave surface of the pixel array and the quarter wave plate may be formed on a convex surface of the optical system facing the pixel array.

The optical system may be a catadioptric optical system having lens elements formed from clear materials such as glass or plastic and having reflective structures. The surfaces of the lens elements and the surface of the pixel array may include convex surfaces and concave surfaces.

DETAILED DESCRIPTION

Electronic devices such as head-mounted display devices may be used for virtual reality and augmented reality systems (sometimes referred to as mixed reality systems). For example, a pair of virtual reality glasses that is worn on the head of a user may be used to provide a user with virtual reality content.

Figure 1:
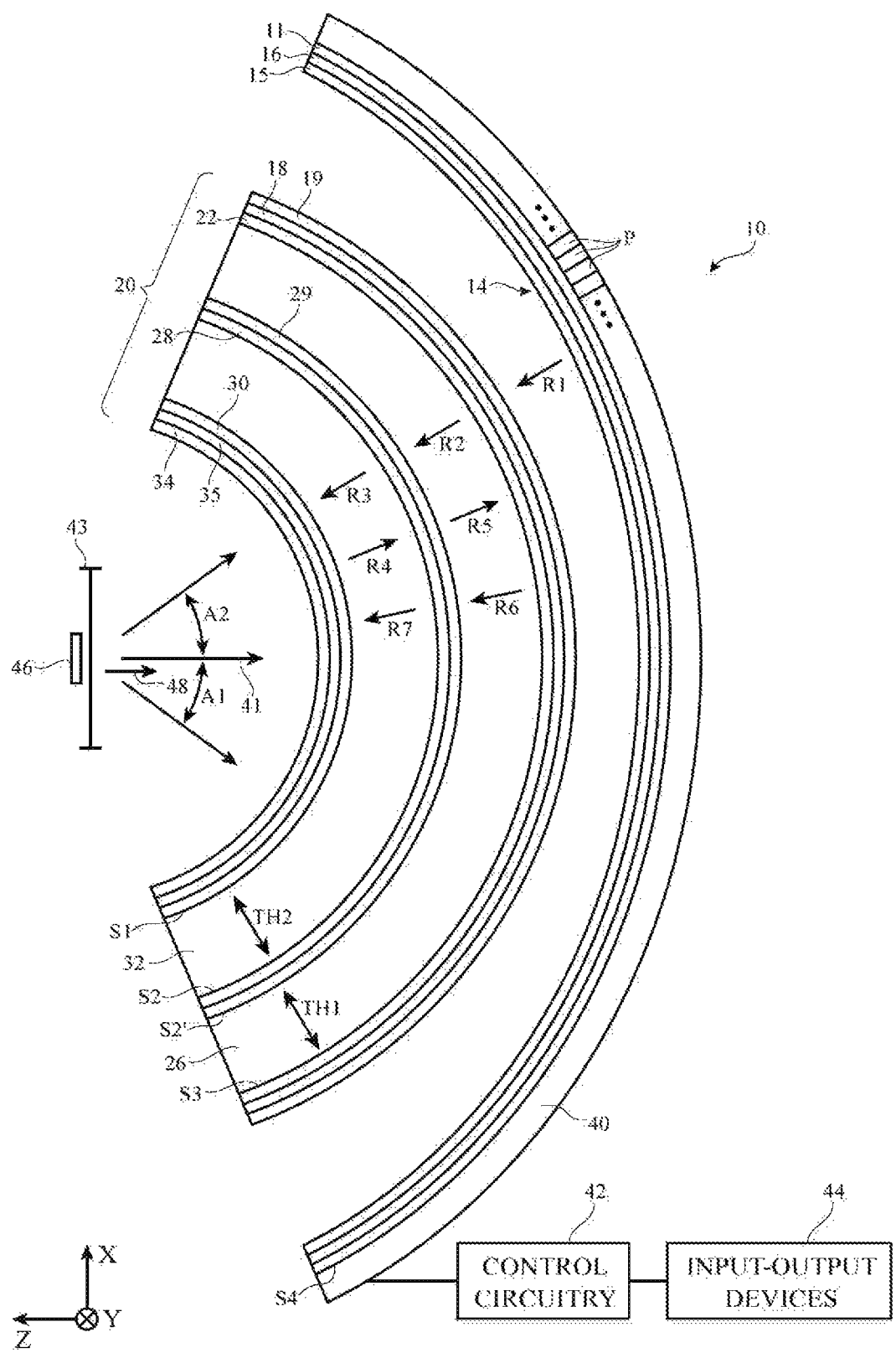
FIG. 1 is a diagram of an illustrative head-mounted device in accordance with an embodiment.

An illustrative system that includes an electronic device such as a head-mounted device is shown in FIG. 1. As shown in FIG. 1, electronic device 10 (e.g., a head-mounted device with support structures configured to be worn on the head of a user such as glasses, goggles, a helmet, hat, etc.) may include a display system with one or more displays 40 (e.g., a display for each of a user's eyes such as eye 46). A single display 40 is shown in FIG. 1. Systems with a pair of displays 40 may present images to a user's left and right eyes simultaneously.

Display 40 has an array of pixels P (pixel array 14) that present images to a user (see, e.g., user eye 46, which is viewing display 40 in direction 48 through an optical system based on catadioptric lens 20). Pixel array 14 of display 40 may be based on a liquid crystal display, an organic light-emitting diode display, an emissive display having an array of crystalline semiconductor light-emitting diode dies, and/or displays based on other display technologies. In a preferred embodiment, the display is a self emitting display, which can be more compact since illumination optics are not required. Separate left and right displays may be included in device 10 for the user's left and right eyes. Each display such as display 40 of FIG. 1 may be spherically (or aspherically) curved, e.g., surface S4 of display 40, which faces eye 46, may be concave.

Visual content (e.g., image data for still and/or moving images) may be provided to display 40 using control circuitry 42 that is mounted in device 10 and/or control circuitry that is mounted outside of device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display 40 to display visual content such as virtual reality content (e.g., computer-generated content associated with a virtual world), pre-recorded video for a movie or other media, or other images. Illustrative configurations in which control circuitry 42 provides a user with virtual reality content using displays such as display 40 may sometimes be described herein as an example. In general, however, any suitable content may be presented to a user by control circuitry 42 using display 40.

Input-output devices 44 may be coupled to control circuitry 42. Input-output devices 44 may be used to gather user input from a user, may be used to make measurements on the environment surrounding device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensors, accelerometers, gyroscopes, and/or other sensors for measuring orientation, position, and/or movement of device 10, proximity sensors, capacitive touch sensors, strain gauges, gas sensors, pressure sensors, ambient light sensors, and/or other sensors). If desired, input-output devices 44 may include one or more cameras (e.g., cameras for capturing images of the user's surroundings, cameras for performing gaze detection operations by viewing eyes 46, and/or other cameras).

As shown in FIG. 1, display 40 may have a concave surface S4. With one illustrative configuration, concave surface S4 of pixel array 14 and display 40 may be a spherical surface and may be radially symmetric about axis 41. Aspherical surface shapes may also be used for surface S4. Catadioptric lens 20 may be configured to focus image light from pixel array 14 into eye box 43 (e.g., a circle of about 10-20 mm in diameter). Eye 46 may be located about 10-30 mm from the innermost surface of lens 20. The field of view of lens 20 may be characterized by angles A1 and A2 with respect to axis 41. Angle A1 may be at least 70° or at least 80° and angle A2 may be at least 30° or at least 40° (e.g., when eye 46 is a right eye and when lens 20 is being viewed from above). Nasal (nose-facing) angle A2 is preferably less than about 50°, because the user's nose prevents a wider nasal field of view. The temporal (temple-facing) angle of view A1 may be larger (e.g., at least 80°) to expand a user's peripheral vision. Overall, the field of view of each lens 20 (e.g., the field of view per eye) may be at least 120°, at least 125°, less than 160°, or other suitable value and the resulting binocular field of view (the field of view for both of a user's eyes taken together) may be at least 150°, at least 160° or other suitable value.

Catadioptric lens 20 may include lens elements such as lens elements 26 and 32. Lens elements 26 and 32 may be formed from glass, polymer, or other materials. Lens elements 26 and 32 may be characterized by curved surfaces S1, S2, and S3. Curved surfaces S1, S2, and S3 of lens element 26 and 32 may be spherical and curved surface S4 of display 40 may be spherical. If desired, one or more of these surfaces may be aspherical. Surface S3 may be a convex surface and may face concave surface S4 of pixel array 14. Lens element 36 may have opposing convex and concave surfaces. Surface S3 may form the convex surface of lens element 26 and surface S2' may form the opposing concave surface of lens element 26. Lens element 32 may also have opposing convex and concave surfaces. Surface S1 may form the concave surface of lens element 32 and surface S2 may form the convex surface of lens element 32. Concave surface S2' has a curvature that matches that of convex surface S2, so concave surface S2' may sometimes be referred to as surface S2 or surfaces S2 and S2' may collectively be referred to as the curved surface between elements 26 and 32.

Optical structures such as partially reflective coatings, wave plates, reflective polarizers, linear polarizers, antireflection coatings, and/or other optical components may be incorporated into device 10. These optical structures may allow light rays from display 40 to be emitted from surface S4 of display 40 and to pass through and/or reflect from surfaces in lens 20 such as surfaces S1, S2, and S3. The radius of curvature of surfaces S1, S2, S3, and S4 may be about 10-70 mm, at least 20 mm, less than 60 mm, 15-35 mm, 20-30 mm, 20-40 mm, or other suitable size. As shown in FIG. 1, lens elements 26 and 32 may be concentric dome lenses that together form a cemented doublet with films and coatings on the various surfaces to control the path of the image light as it passes through the catadioptric lens 20 and may have respective thicknesses TH1 and TH2. Thickness TH1 may be uniform throughout element 26 (e.g., TH1 may vary by less than 5%, less than 10%, or less than another suitable amount throughout element 26). Thickness TH2 may be uniform throughout element 32 (e.g., TH2 may vary by less than 5%, less than 10%, or less than another suitable amount throughout element 26).

Chromatic aberrations may be minimized by forming most of the lens power of lens 20 from the reflective structures of lens 20 and by forming only a small amount (e.g., negligible amount) of the lens power of lens 20 through refraction by lens elements 32 and 26. As an example, lens 20 may be characterized by a refractive effective focal length of −170 mm and a total effective focal length of +35 mm. With this type of configuration the overall focal length of lens 20 has a positive sign rather than a negative sign when the reflective contribution and the refractive contribution are combined because the reflective structures of lens 20 dominate the overall performance of the lens. This helps reduce chromatic aberrations which are associated with refractive lens power. In general, lens 20 may have any suitable focal length (e.g., 30-40 mm, at least 15 mm, at least 25 mm, less than 45 mm, less than 55 mm, etc.). The reflective contribution to the lens power of lens 20 may be greater than the refractive contribution to the lens power (e.g., the reflective contribution may be at least three times, at least five times, at least ten times, or more than the refractive contribution).

Linear polarizer 16 and a retarder such as a quarter wave plate 15 may be located between pixel array 14 and lens element 26. Linear polarizer 16 and quarter wave plate 15 may be used to circularly polarize light emitted by display 40. Linear polarizer 16 may have a pass axis aligned with the X-axis of FIG. 1 (as an example) and the fast axis of the quarter wave plate 14 is aligned at 45 degrees to the pass axis of the linear polarizer.

With the illustrative arrangement of FIG. 1, linear polarizer 16 is formed on surface S4 of pixel array 14. Linear polarizer 16 may be formed from a polarizer film that is thermoformed into a shape to match concave surface S4 and attached to surface S4 with a layer of adhesive such as optically clear adhesive 11. If desired, linear polarizer 16 may be formed on convex surface S3 of lens element 26 or may be located at other suitable locations between surfaces S4 and S3. The quarter wave plate 14 can be a film or coating that is attached to the linear polarizer 16 and surface S3. Optional antireflection coating may be formed on any surfaces that are exposed to air (e.g., the polarizer surface or the quarter wave surface) to enhance light transmission.

Alternatively, quarter wave plate 15 may be located on surface S3, shown as quarter wave plate 18 in FIG. 1, where quarter wave plate 18 may be a formed film or a coating that is applied to partially reflective mirror coating 22. Optional antireflection coating 19 may be formed on quarter wave plate 18 to enhance light transmission.

Surface S3 may have significant curvature, so the use of a coating process may help ensure satisfactory formation of quarter wave plate 18. With one illustrative configuration, quarter wave plate 18 may be a liquid-crystal-based retarder layer (e.g., a birefringent coating formed from liquid crystals in a liquid polymer binder that is applied to surface S3 on top of layer 22 by spin coating or other suitable deposition techniques followed by ultraviolet light curing and/or thermal curing). In either embodiment, associating a quarter wave plate (15 or 18) with a linear polarizer 16 will cause the image light entering the lens 20 to be circularly polarized provided that the fast axis of the quarter wave plate is oriented at 45 degrees to the pass axis of the linear polarizer 16.

A partially reflective mirror coating forms partially reflective mirror 22. The coating for mirror 22 is a metal mirror coating or other mirror coating layer such as a dielectric multilayer coating with a 50% transmission and a 50% reflection or other suitable light transmission and reflection values. Partially reflective mirror 22 may be formed on convex surface S3 of lens element 26. When circularly polarized image light (e.g., ray R1) strikes partially reflective mirror 22, a portion of ray R1 will pass through partially reflective mirror 22 to become reduced-intensity ray R2. Simultaneously, a portion of ray R1 will be reflected by the partially reflective mirror 22. This reflected portion of ray R1 will pass back through the quarter wave plate 18 or 15 such that the circularly polarized light is converted to linearly polarized light with the opposite polarization state so that it will be absorbed by the linear polarizer 16, thereby trapping the reflected light and reducing stray light in the optics of the electronic device 10.

Ray R2 is circularly polarized. A second quarter wave plate such as quarter wave plate 28 may be included in optical system 20 between the partially reflective mirror 22 and a reflective polarizer 30, to convert the circular polarization state of ray R2 into a linear polarization state. The second quarter wave plate may be formed under the partially reflective mirror 22 on surface S3 (not shown), on convex surface S2 of lens element 32 (shown as quarter wave plate 28), on associated concave surface S2' of lens element 26, and/or may be formed on the concave surface S1 of lens element 32 (not shown) with reflective polarizer 30 on top of the quarter wave plate. Alternatively, a thin (about 1 mm) curved spherical dome lens 34 may be provided with an optically clear adhesive 35 that adhesively bonds the reflective polarizer to it. The dome lens 34 with the reflective polarizer 30 can then be adhesively bonded to surface S1. In the illustrative configuration of FIG. 1, quarter wave plate 28 has been formed from a coating layer (e.g., a birefringent liquid-crystal-based polymer layer) on surface S2. Optically clear adhesive layer 29 may be used to attach lens elements 26 and 32 together.

Quarter wave plate 28 may convert circularly polarized ray R2 into a linearly polarized ray R3 aligned with the Y-axis of FIG. 1. Reflective polarizer 30 may be a polymer film (e.g., a multilayer reflective polarizer film or a wire-grid polarizer film) that is thermoformed onto concave surface S1 of lens element 32. However, surface S1 may have significant curvature making thermoforming undesirable due to the large distortion imparted to the reflective polarizer film, as a result, it may be desirable to form reflective polarizer 30 from a coating layer. With one illustrative configuration, reflective polarizer 30 may be a wire-grid polarizer formed using a sol-gel process. During formation of reflective polarizer 30, a glass-based sol-gel liquid is applied to surface S1 and is patterned using a stamper with a nanoscale polarizer pattern, where the solgel can included electrically conductive components or electrically conductive materials can be preferentially applied to the solgel pattern to form an array of nanoscale wire conductors that together form the wire-grid polarizer. Other reflective polarizer coating techniques may be used, if desired.

Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30. In the illustrative arrangement of FIG. 1, reflective polarizer 30 has a reflection axis that is aligned with the Y-axis, so ray R3 will reflect from reflective polarizer 30 at surface S1 as reflected ray R4.

Reflected ray R4 has a linear polarization aligned with the Y-axis. After passing through quarter wave plate 28, the linear polarization of ray R4 will be converted into circular polarization (i.e., ray R4 will become circularly polarized ray R5).

Circularly polarized ray R5 will travel through lens element 26 and a portion of ray R5 will be reflected in the Z direction by the partially reflective mirror 22 on the convex surface S3 of lens element 26 as reflected ray R6. The reflection from the curved shape of surface S3 provides optical system 20 with additional optical power. The portion of ray R5 that is transmitted by partially reflective mirror 22 is converted from circularly polarized light to linearly polarized light by quarter wave plate 18. This linearly polarized light has a polarization aligned with the Y axis so that it is absorbed by linear polarizer 16. As a result, contrast degradation and stray light artifacts from the transmitted portion of ray R5 are prevented in the image viewed by the user.

Ray R6 is circularly polarized. After passing back through lens element 26 and quarter wave plate 28, ray R6 will become linearly polarized (ray R7). The linear polarization of ray R7 is aligned with the X-axis of FIG. 1, which is parallel to the pass axis of reflective polarizer 30. Accordingly, ray R7 will pass through reflective polarizer 30 to provide a viewable image to the user. If desired, device 10 may include an additional linear polarizer such as a clean-up linear polarizer (not shown) positioned between the reflective polarizer 30 and the user's eye 46, where the clean-up linear polarizer 34 has a pass axis aligned with the pass axis of reflective polarizer 30 (i.e., parallel to the X-axis in this example) and will therefore remove any residual non-X-axis polarization from ray R7 before ray R7 reaches viewers eye 46. The clean-up polarizer will also absorb any light from the environment that would otherwise be reflected by the reflective polarizer 30. The clean-up linear polarizer may be a polarizer film that is thermoformed onto reflective polarizer 30 and attached using adhesive 35 or may be located elsewhere between the reflective polarizer 30 and eye 46.

Deposition techniques that may be used in forming coatings in lens 20 and on display 40 include liquid coating techniques (ink-jet printing, screen printing, pad printing, spinning, dipping, dripping, painting, and spraying), atomic layer deposition, physical vapor deposition techniques such as sputtering and evaporation, chemical vapor deposition, plasma-enhanced chemical vapor deposition, and/or other thin-film deposition techniques.

Figure 2:
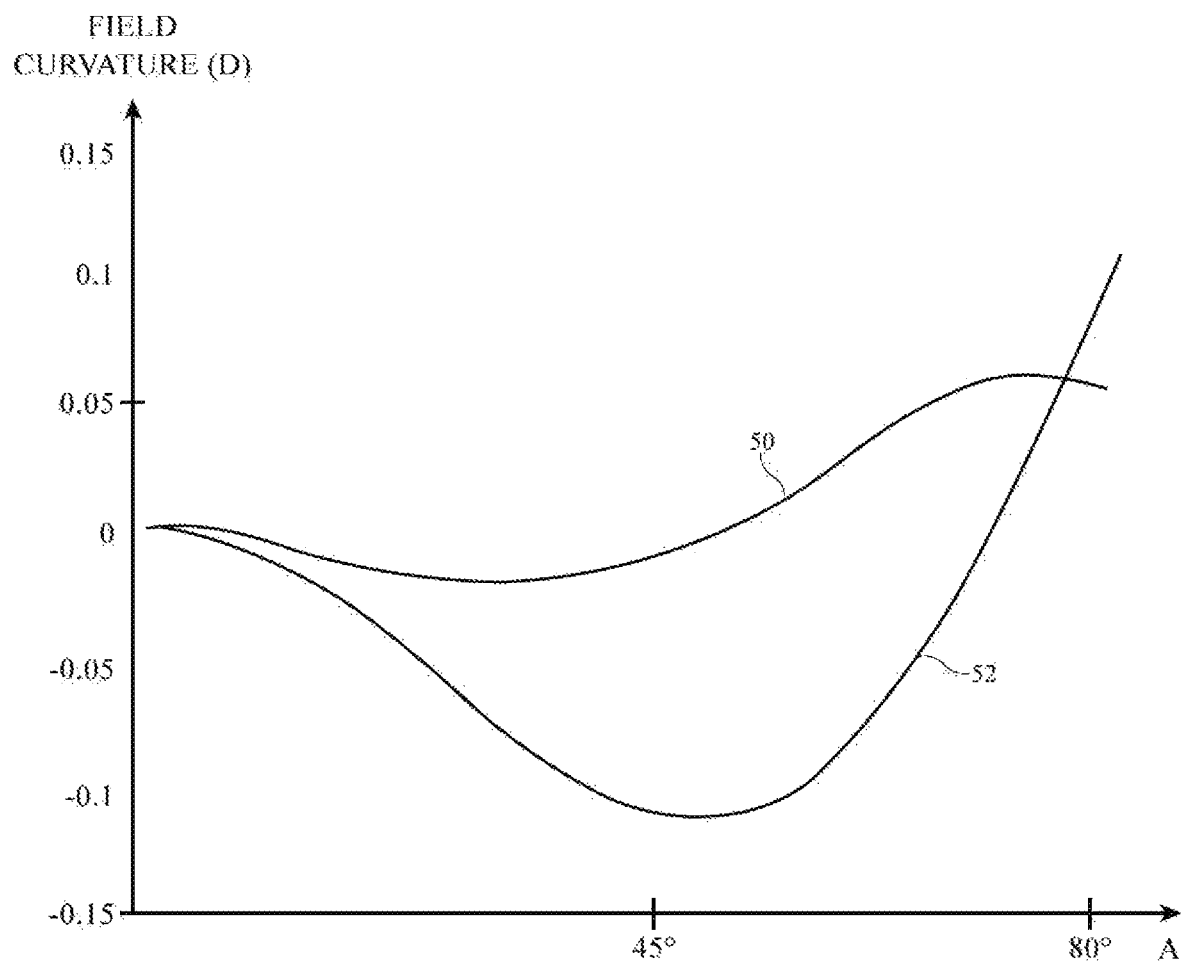
FIG. 2 is a graph in which modeled field curvature values have been plotted versus viewing angle for a lens in accordance with an embodiment.
Figure 3:
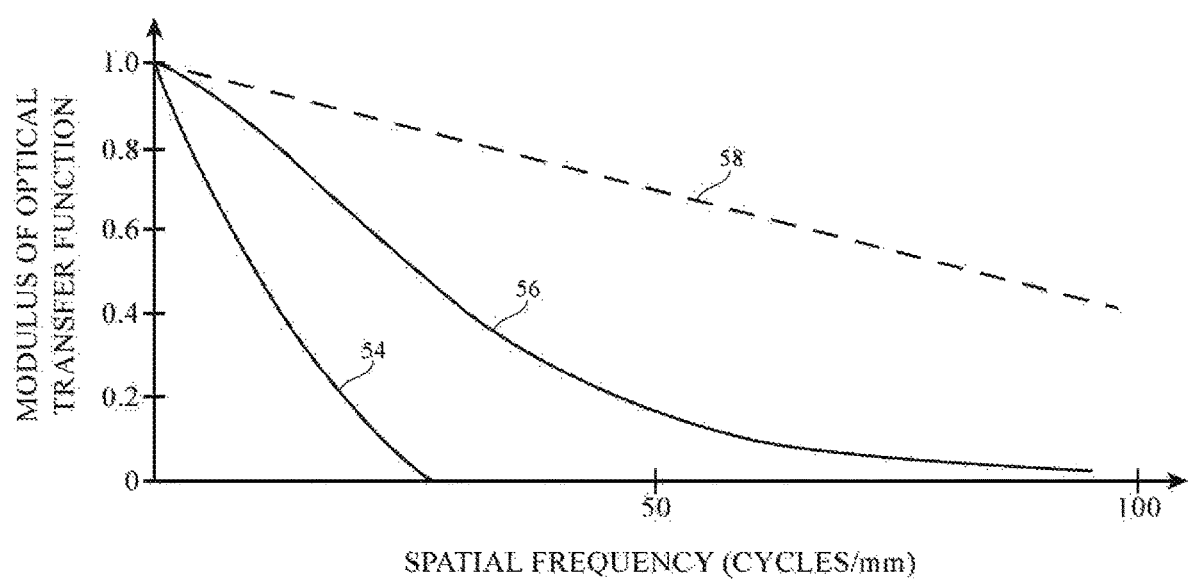
FIG. 3 is a graph in which the modulus of the optical transfer function for a lens has been plotted as a function of spatial frequency in accordance with an embodiment.

The configuration of FIG. 1 (e.g., the curved concave emitting surface S4 of display 40) may help improve optical performance for device 10. As an example, curved surface S4 may help reduce field curvature across the displayed field of view so that the user is presented an image with more uniform sharpness. Field curvature (in diopters D or $m^{-1}$) for the arrangement of FIG. 1 has been modeled and plotted as a function of light ray angle A (e.g., angle A1 and A2) relative to axis 48 in the graph of FIG. 2. As shown by curves 50 (tangential) and 52 (sagittal), field curvature may be less than 0.15 diopters across all expected angles of view (e.g., 0-80° in the example of FIG. 2). In FIG. 3, the modulus of the optical transfer function for lens 20 has been plotted as a function of spatial frequency. Curve 58 represents the diffraction limit. Curves 54 and 56, which correspond to light rays oriented at an angle A of 80° with respect to axis 41 of FIG. 1, respectively show how tangential light and sagittal light may exhibit satisfactory transfer function values and therefore shows how lens 20 exhibits satisfactory optical performance at large field angles. The curved concave emitting surface S4 of the display 40 also reduces the cone angle of image light at each surface. FIG. 1 shows that the image light (R1 to R7) is provided such that the chief ray angle at surfaces S4, S3, S2 and S1 is less than 10 degrees from normal. By reducing the angular range that the linear polarizer, quarter wave plate, partially reflective mirror coating and reflective polarizer need to operate with, the performance of the films and coatings can be greatly improved so that image contrast is increased and ghosting is reduced.

Figure 4:
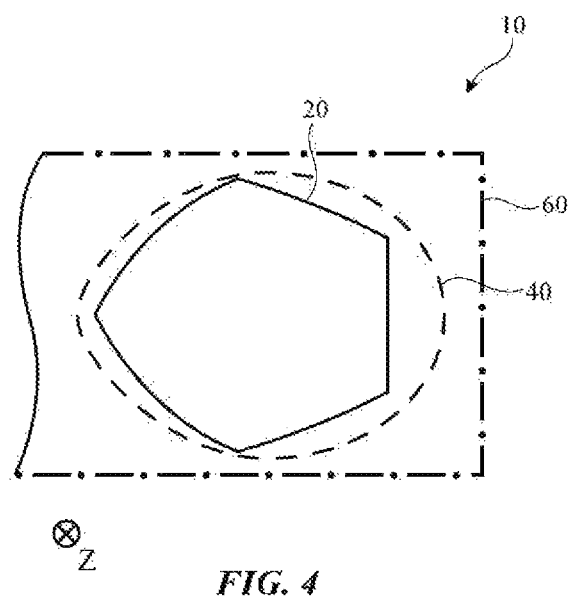
FIG. 4 is a front view of a portion of an illustrative device in accordance with an embodiment.

FIG. 4 is a front view of a portion of device 10 showing an illustrative outline (e.g., an illustrative shape when viewed along axis Z) of lens 20 relative to display 40 and support structures 60, where the lens 20 or the display 40 may be ovoid shaped or polyhedral shaped to better fit the contours of the user's face or eye socket. System components such as display 40 and lens 20 may be supported by support structures 60 that are configured to be worn on the head of a user. Support structures 60, which may sometimes be referred to as a device housing or body, may support a pair of lenses (e.g., left and right lenses respectively for a user's left and right eyes and associated left and right displays 40) such as catadioptric lens 20 of FIG. 1. Support structures (housing structures) 60 may have the shape of a frame for a pair of glasses (e.g., device 10 may resemble eyeglasses), may have the shape of a helmet (e.g., device 10 may form a helmet-mounted display), may have the shape of a pair of goggles, or may have any other suitable head-mounted shape that allows support structures 60 to be worn on the head of a user. As shown in FIG. 1, support structures 60 of FIG. 4 may support lens 20 and display(s) 40 in front of a user's eyes (see, e.g., eye 46 of FIG. 1) so that the user may view display 40 through lens 20 in direction 48. If desired, support structures 60 may have other suitable configurations.

Support structures 60 may be formed from plastic, metal, fiber-composite materials such as carbon-fiber materials, wood and other natural materials, glass, other materials, and/or combinations of two or more of these materials.

Input-output devices 44 and control circuitry 42 of FIG. 1 may be mounted in support structures 60 and/or portions of input-output devices 44 and control circuitry 42 may be coupled to device 10 using a cable, wireless connection, or other signal paths.

If desired, the curvature of display 40 or position of the display 40 relative to the lens 20 may be adjusted dynamically. For example, control circuitry 42 may adjust the curvature of display 40 to adjust the focus of device 10. The position of the display 40 relative to the lens 20 may be made with actuators and guidance mechanisms to move the components relative to one another in a controlled fashion. Focus adjustments may be made, for example, to correct user vision defects such as myopia and farsightedness or may be made dynamically based on the type of content being displayed on display 40 (distant content such as mountains or close-up content such as the faces of nearby people in a scene) to reduce vergence-accommodation mismatch effects.

Figure 5:
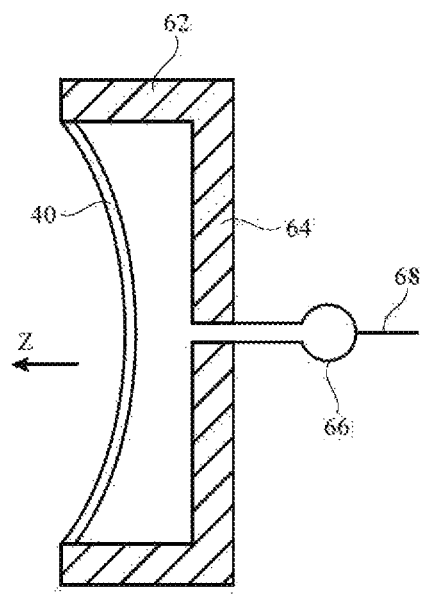
FIG. 5 is a cross-sectional side view of a portion of an illustrative display in a device with a variable pressure chamber to adjust display curvature in accordance with an embodiment.

An illustrative configuration that may be used in device 10 to adjust the curvature of display 40 is shown in FIG. 5. As shown in FIG. 5, display 40 may be mounted in a support structure such as frame 62. Frame 62 may have an opening that receives display 40 so that an air-tight cavity such as cavity 64 is formed behind display 40. A pump (or diaphragm actuator) such as pump 66 may receive control signals from control circuitry 42 via control input 68. In response to control signals from control circuitry 42, pump 66 may increase or decrease the pressure of air or other gas or fluid in cavity 64. Increases in pressure will tend to flatten display 40 so that display 40 is more planar. Decreases in pressure will tend to bow display 40 in the −Z direction so that display 40 is more curved and less planar. Adjustments to the curvature of display 40 and/or the spacing between display 40 and lens 20 may also be made using piezoelectric actuators or other actuators having structures that expand and contract in response to changes in applied voltage, using shape memory alloys, using electromagnetic actuators, using servomotors, other actuators, and/or other display curvature adjusting device. The use of a display curvature adjusting device such as a pressure-based actuator is illustrative.

In embodiments, the lens is comprised of two or more dome lenses with films or coatings on each surface.

The foregoing is merely illustrative and various modifications can be made to the described embodiments. The foregoing embodiments may be implemented individually or in any combination.

What is claimed is:

1. An electronic device configured to display images, comprising:
   an array of pixels configured to produce the images, wherein the array of pixels has a concave surface;
   a linear polarizer through which light associated with the images passes;
   a first lens element having a convex surface and an opposing concave surface;
   a second lens element having a concave surface and an opposing convex surface that matches the concave surface of the first lens element; and
   a partially reflective mirror on the convex surface of the first lens element.

2. The electronic device defined in claim 1 further comprising:
   a reflective polarizer on the concave surface of the second lens element.

3. The electronic device defined in claim 2 wherein the linear polarizer is between the convex surface of the first lens element and the array of pixels, the electronic device further comprising:
   an additional linear polarizer through which the light passes after passing through the reflective polarizer.

4. The electronic device defined in claim 3 wherein the reflective polarizer is formed as a coating on the concave surface of the second lens element.

5. The electronic device defined in claim 1 further comprising:
   a quarter wave plate between the first and second lens elements.

6. The electronic device defined in claim 5 further comprising:
   an additional quarter wave plate that receives light from the linear polarizer.

7. The electronic device defined in claim 6 wherein the quarter wave is formed as a coating on the convex surface of the second lens element and the additional quarter wave plate is formed as a coating on the partially reflective mirror on the convex surface of the first lens element.

8. The electronic device defined in claim 1 wherein the linear polarizer is attached with adhesive to the concave surface of the array of pixels.

9. The electronic device defined in claim 1 wherein the linear polarizer is between the convex surface of the first lens element and the array of pixels.

10. The electronic device defined in claim 1 wherein the array of pixels has a curvature, the electronic device further comprising:
- a display curvature adjusting device; and
- control circuitry configured to control the display curvature adjusting device to adjust the curvature of the array of pixels.

11. The electronic device defined in claim 10 wherein the display curvature adjusting device comprises a pump.

12. Apparatus, comprising:
- an array of pixels with a concave surface configured to produce images;
- a first quarter wave plate that receives the light from the array of pixels;
- a first lens element having first and second opposing surfaces;
- a second lens element having third and fourth opposing surfaces, wherein the second surface is a concave surface, wherein the third surface is a convex surface faces the second surface, wherein the first surface is a convex surface facing the array of pixels, and wherein the fourth surface is a concave surface;
- a partially reflective mirror on the first surface; and
- a second quarter wave plate that is between the second and third surfaces.

13. The apparatus defined in claim 12 further comprising a linear polarizer interposed between the array of pixels and the first lens element.

14. The apparatus defined in claim 12 further comprising:
- a reflective polarizer on the fourth surface.

15. The apparatus defined in claim 14 wherein the reflective polarizer is a coating on the concave fourth surface.

16. The apparatus defined in claim 12 wherein the second quarter wave plate is a coating on the convex third surface.

17. An electronic device, comprising:
- a display with a concave surface, wherein the display produces light for images; and
- a catadioptric lens that focuses the light, wherein the catadioptric lens includes:
  - a first lens element having a first surface that is convex and having an opposing second surface,
  - a partially reflecting mirror on the first surface,
  - a second lens element having a third surface that matches the second surface of the first lens element and having an opposing fourth surface that is concave, and
  - a reflective polarizer on the fourth surface.

18. The electronic device defined in claim 17 wherein the field of view of the catadioptric lens is at least 120°.

19. The electronic device defined in claim 18 wherein the first and second lens elements each have a radius of curvature of 20-40 mm.

20. The electronic device defined in claim 19 wherein the catadioptric lens has a lens power with a refractive contribution and a reflective contribution and wherein the reflective contribution is at least five times more than the refractive contribution.

* * * * *